May 12, 1931. T. BRADY 1,805,305
LUBRICATING DEVICE FOR ELEVATOR GUIDE RAILS
Filed Sept. 19, 1929 2 Sheets-Sheet 1

Thomas Brady INVENTOR
BY Walter T. S. Bradley ATTORNEY

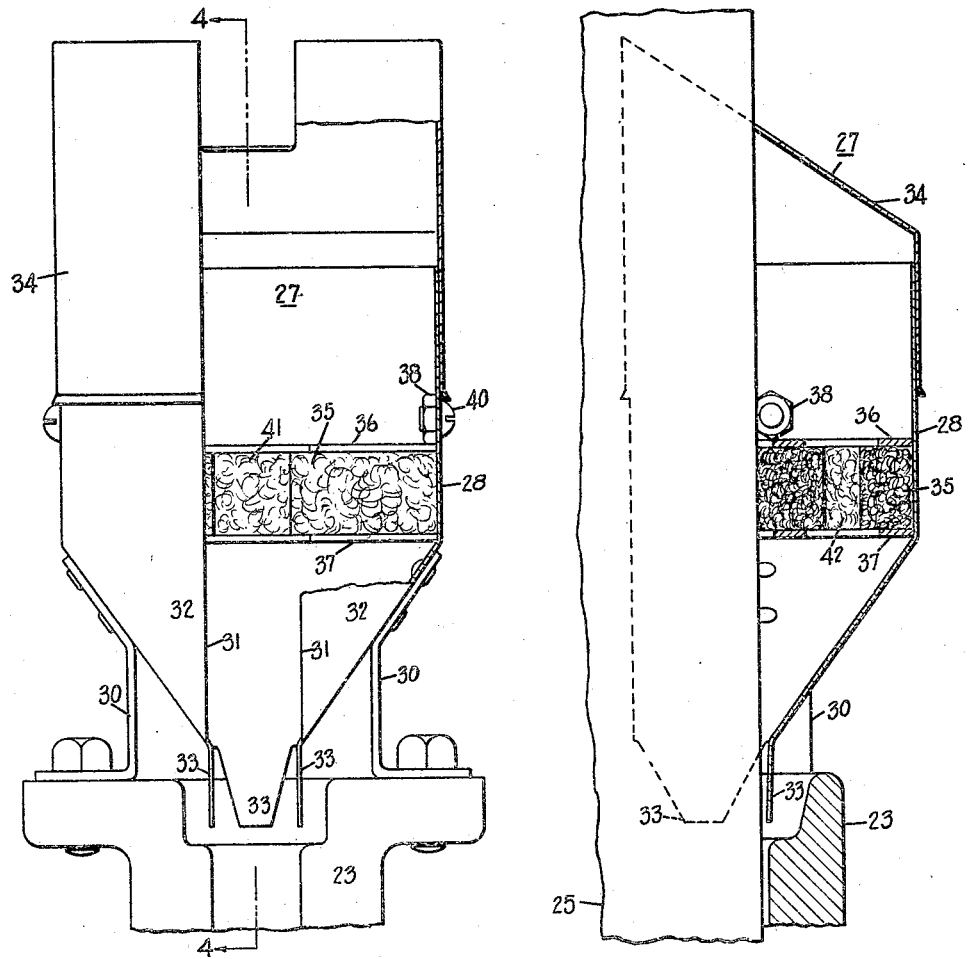
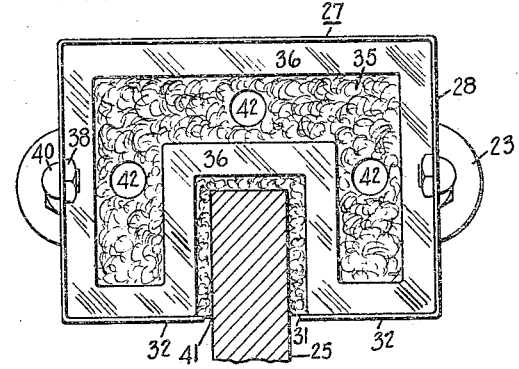

Patented May 12, 1931

1,805,305

UNITED STATES PATENT OFFICE

THOMAS BRADY, OF EAST ORANGE, NEW JERSEY, ASSIGNOR TO OTIS ELEVATOR COMPANY, OF NEW YORK, N. Y., A CORPORATION OF NEW JERSEY

LUBRICATING DEVICE FOR ELEVATOR GUIDE RAILS

Application filed September 19, 1929. Serial No. 393,708.

This invention relates to oil distributors and particularly to oil distributors for the guide rails in the hatchway of an elevator installation.

It is desirable in elevator installations to reduce the friction arising from movement of the guide shoes carried by the elevator car or counterweight along the guide rails in the hatchway. Such friction may be reduced by applying a lubricant to the guide rails. It is also desirable that the amount of lubricant on the guide rails shall not be excessive and that the lubricant be uniformly distributed along the guide rails in order to avoid splashing the lubricant upon the hatchway walls, the elevator car, or other objects in the hatchway, as a result of movement of the elevator car.

A feature of the present invention is a lubricant distributor arranged to uniformly distribute the lubricant on the guide rails of elevator installations.

A second feature of the invention resides in the provision of a lubricant distributor arranged to prevent splashing of lubricant from the guide rails onto the hatchway walls, the elevator car or objects in the hatchway upon movement of the elevator car.

A third feature is a lubricant distributor of simple and rugged construction, which may be cheaply manufactured and easily installed.

The embodiment of the invention to be described contemplates the provision of lubricant distributor casings mounted on the guide shoes carried by the elevator car or counterweight. A pad of absorbent material is supported in the distributor housing and is formed to engage the guide rails to wipe the lubricant from the guide rails when the car is in motion. The pad absorbs the lubricant wiped from the guide rails until the saturation point is reached, the excess lubricant being then reapplied to the guide rails to insure proper lubrication.

In the drawings:—

Figure 3 is a front elevation of an oil distributor mounted on a guide shoe, the guide rail being omitted and parts being shown in section to illustrate the construction of the oil distributor;

Figure 4 is a view taken along the line 4—4 of Figure 3, the guide rail being also included; and Figure 5 is a plan view of an oil distributor with the cover removed, the distributor being shown mounted on a guide shoe and in cooperative relation to a guide rail.

Figure 1:
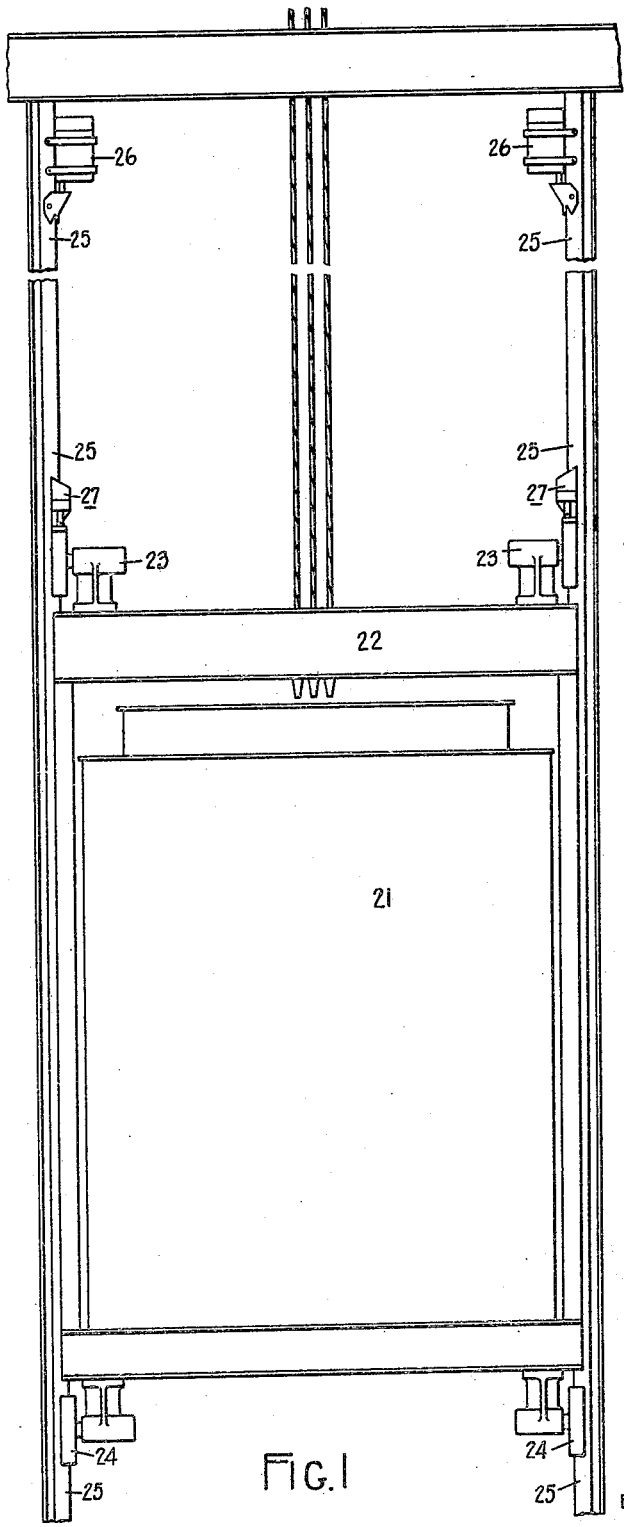
Figure 1 is a schematic view of an elevator installation showing a pair of oil distributors mounted on guide shoes carried by the elevator car for cooperation with the guide rails.

Referring to the drawings, an elevator car designated 21 is supported by a car sling 22 to which hoisting roping is attached to effect movement of the elevator car in the hatchway. Guide shoes 23 and 24 mounted on the car sling are arranged to cooperate with guide rails 25 to guide the movement of the car in the hatchway. In order that the friction arising from contact of the guide shoes with the guide rails when the car is in motion may be reduced a lubricant, such as oil, is applied to the guide rails, as for example by suitable lubricating devices 26 mounted on the guide rails near the top of the hatchway. The oil applied to the guide rails by the lubricating devices 26 flows downwardly along the guide rails to lubricate the latter throughout their length.

Figure 2:
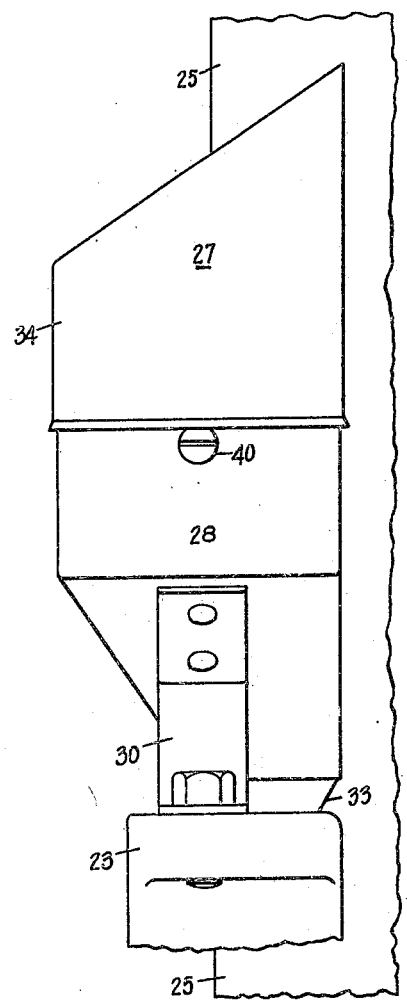
Figure 2 is a side elevation of an oil distributor shown mounted on a guide shoe for cooperation with a guide rail.

Oil distributing devices designated as a whole by 27 are carried by each guide shoe 23 for cooperation with the guide rails 25. As the oil distributors carried by each guide shoe are similar only a single oil distributor will be described in detail. The oil distributor has a casing 28 secured to the guide shoe 23 by brackets 30 so that the guide rail 25 extends within the casing 28 through a slot 31 in the front wall 32 of the casing. The lower portions of the side walls and of the rear wall are formed to extend toward the faces and edge respectively of the guide rail and terminate in tips 33 parallel to the faces and edge of the guide rail for a purpose which will appear as the description proceeds. The tips 33 extend into a recess formed in the end of the guide shoe. A cover member 34 is provided for casing 28, the front wall and top of the cover member being cut away to receive the guide rail when the cover is fitted on the casing. The top of the cover member slants downwardly away from the guide rail as shown in Figures 2 and 4.

A pad 35 of absorbent material, such as waste or felt, is held in place in the casing 28 by retainers 36 and 37. The retainers 36 and 37 are shaped so as not to obstruct the projection of the guide rail into the casing. The retainer 37 on which pad 35 rests in supported in the casing as by the converging portions of the side and rear walls of the casing, while the retainer 36 is held in contact with pad 35 by nuts 38 carried by screws 40 passing through the side walls of the casing. The central portion of the retainers 36 and 37 is cut away leaving a bandlike rim adjacent the walls of casing 28 and the edge and side faces of the guide rail 25. A slot 41 is cut through the pad 35 to receive the guide rail 25, the material of the pad adjacent the slot being in wiping contact with the edge and faces of guide rail 25 so that upon movement of the car pad 35 will wipe the edge and faces of the guide rail and absorb the excess oil thereon. A series of openings 42 extend through pad 35 to assist the flow of lubricant from the pad when the latter becomes saturated with lubricant.

The operation is as follows: A small quantity of oil is continuously applied to the guide rails 25 by the lubricators 26 and flows downwardly along the guide rails to lubricate the latter throughout their length. Oil is supplied to the guide rails by the lubricating devices although the car may not be in use. It is obvious therefore that when the car is out of operation for an extended period, as for example during week-ends, oil in excess of the amount required for proper lubrication will accumulate on the guide rails.

When the elevator car is again restored to service and moves upwardly in the hatchway, the pads 35 move along the guide rails 25 in contact therewith in advance of the guide shoes 23 and wipe the oil from the guide rails to prevent the guide shoes from splashing oil onto the hatchway walls, the elevator car or other objects in the hatchway. In the event that the amount of oil on the guide rails is so excessive as to be splashed by movement of the pads 35 along the guide rails, the oil splashed by the pads will strike the sloping top and sides of the cover member 34 and flow therealong to pad 35. The pads 35 absorb the oil wiped from the guide rails 25 until the saturation point is reached. The oil will then flow from the pad and through the openings 42 therein onto the converging portions of the sides of the casing and will be directed by the tips 33 onto the surfaces of the guide shoes 23 in contact with the guide rails 25. Thus, when the car is in motion, the pads will wipe the oil from the guide rails redistributing sufficient oil along the guide rails for proper lubrication.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an elevator installation; a hatchway; a body movable in said hatchway; guide rails in said hatchway for said body; guide means carried by said body adapted to cooperate with said guide rails to guide the movement of said body in said hatchway; means adapted to lubricate said guide rails; and means adapted to prevent splashing of said lubricant by said guide means upon movement of said body comprising, a casing mounted on said body, means mounted in said casing adapted to engage said guide rails to wipe lubricant therefrom, said means being also adapted to absorb the lubricant wiped from said guide rails and redistribute said lubricant along said guide rails.

2. In an elevator installation; a hatchway; a body movable in said hatchway; guide rails in said hatchway; guide shoes carried by said body adapted to cooperate with said guide rails to guide the movement of said body in said hatchway; means adapted to apply a lubricant to said guide rails; and a plurality of lubricant distributors carried by said body, each lubricant distributor comprising, a casing mounted on said body having one end wall and the side walls thereof formed to extend toward said guide rails, an absorbent member mounted in said casing adapted to engage a guide rail to wipe lubricant from said rail upon movement of said car and to absorb the lubricant until it becomes saturated, said lubricant being then directed by said walls onto said guide rail and the faces of said guide shoe which cooperate with said guide rail.

3. In an elevator installation; a hatchway; a body movable therein; guide rails in said hatchway; guide shoes carried by said body adapted to cooperate with said guide rails to guide the movement of said body in said hatchway; means adapted to apply lubricant to said guide rails near their upper ends; lubricant distributors carried by said body, each distributor comprising, a housing, one end wall and the side walls of said housing having portions which converge near their lower ends, an absorbent pad in said housing, and retainers adapted to support said pad in said housing, said retainers and the front wall and top of said housing being cut away to permit a guide rail to extend into said housing for cooperation with said pad, whereby upon movement of said body said pads wipe lubricant from said guide rails and absorb said lubricant to prevent splashing of said lubricant by said guide shoes, and said converging portions direct the lubricant flowing from said pad, upon saturation thereof, onto said guide rails and the surfaces of said guide shoes cooperating therewith to distribute the lubricant along said guide rails.

In testimony whereof, I have signed my name to this specification.

THOMAS BRADY.